Feb. 6, 1968       C. H. HEEREN       3,367,425
MULCHING DEVICE
Filed Feb. 10, 1965       2 Sheets-Sheet 1
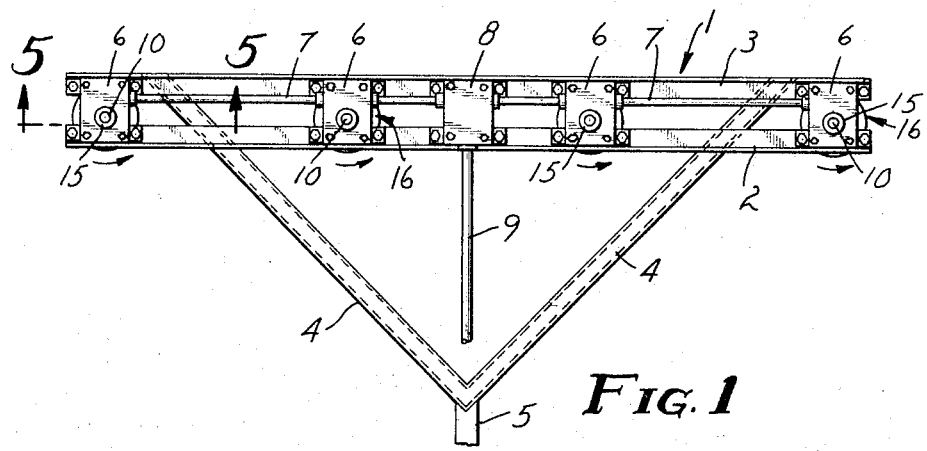
FIG. 1
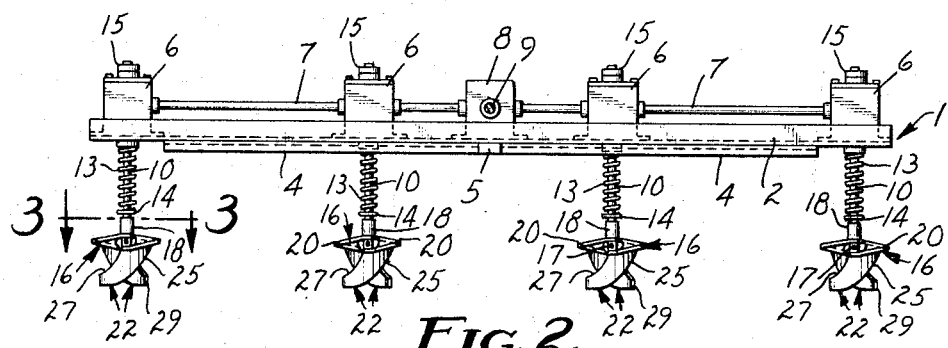
FIG. 2                          FIG. 4
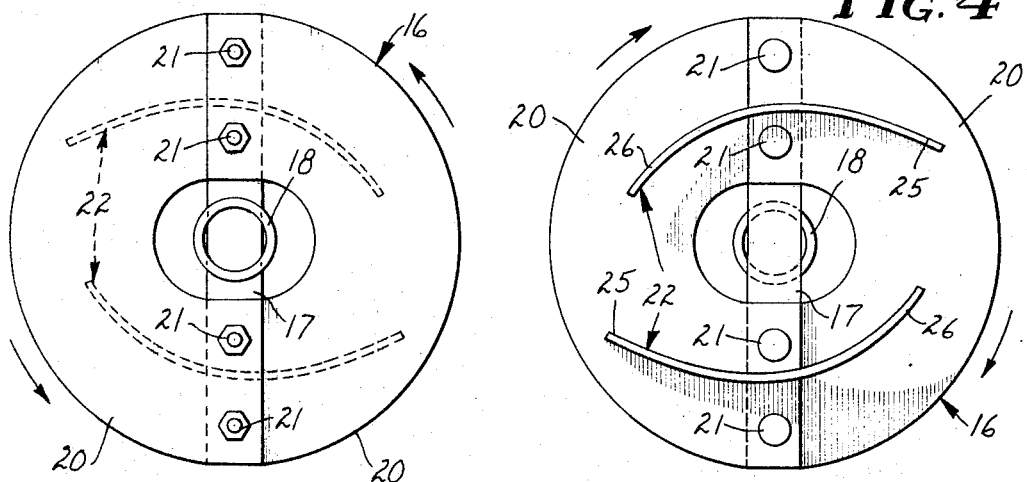
FIG. 3
INVENTOR.
CLYDE H. HEEREN
BY
Merchant, Merchant & Gould
ATTORNEYS Feb. 6, 1968     C. H. HEEREN     3,367,425

MULCHING DEVICE

Filed Feb. 10, 1965     2 Sheets-Sheet 2

INVENTOR.
CLYDE H. HEEREN
BY
Merchant, Merchant & Gould
ATTORNEYS

United States Patent Office 3,367,425
Patented Feb. 6, 1968

3,367,425
MULCHING DEVICE
Clyde H. Heeren, Walshville, Ill., assignor to Farmhand, Inc., a corporation of Delaware
Filed Feb. 10, 1965, Ser. No. 431,646
6 Claims. (Cl. 172—111)

ABSTRACT OF THE DISCLOSURE

A rotary earth mulching device for mounting on the lower end of a mobile vertical rotary shaft and having a pair of circumferentially spaced generally vertical mulching blades depending from a pair of generally helical plates, which engage the top surface of the ground to limit downward movement of the blades during rotation thereof in the earth.

---

This invention relates generally to agricultural implements, and more particularly to improvements in earth mulchers used in preparation of the soil for planting seeds.

Specifically, this invention is in the nature of an improvement in mulcher heads of the type disclosed in my prior U.S. Letters Patent Reissue 25,237, and in the Heeren et al. U.S. Letters Patent No. 3,084,748.

An important object of this invention is the provision of a mulcher head which can be used in connection with conventional planting equipment to condition a plowed field for planting without the necessity for other independent field preparation operations such as discing, harrowing or the like.

Another object of this invention is the provision of a mulcher head having mulcher blades which enter the soil easily and which are shaped to ride over stones and other hard objects imbedded in the earth without damage to the blades.

Another object of this invention is the provision of a mulcher head having mulching blades which are equally adapted for use in loose sandy soil as well as heavier clayey types of soil.

Another object of this invention is the provision of a mulcher head having novel means for limiting the depth of penetration of the mulching blades into the earth.

Still another object of this invention is the provision of a mulcher head having mulcher blades which may be quickly and easily removed and replaced if necessary.

Another object of this invention is the provision of a mulcher head which is relatively simple and inexpensive to produce, which requires relatively low power to operate, and which is rugged in construction and durable in use.

The above, and still further highly important objects and advantages of this invention will become apparent from the following specification, appended claims and attached drawings.

Referring to the drawings, which illustrate the invention, and in which like reference characters indicate like parts throughout the several views:

FIG. 1 is a view in top plan of a mulching implement incorporating the use of the mulcher head of this invention;

FIG. 2 is a view in front elevation;

FIG. 3 is an enlarged view partly in plan and partly in horizontal section, taken substantially on the line 3—3 of FIG. 2;

FIG. 4 is a view in bottom plan of the mulcher head of FIG. 3;

Figure 5:
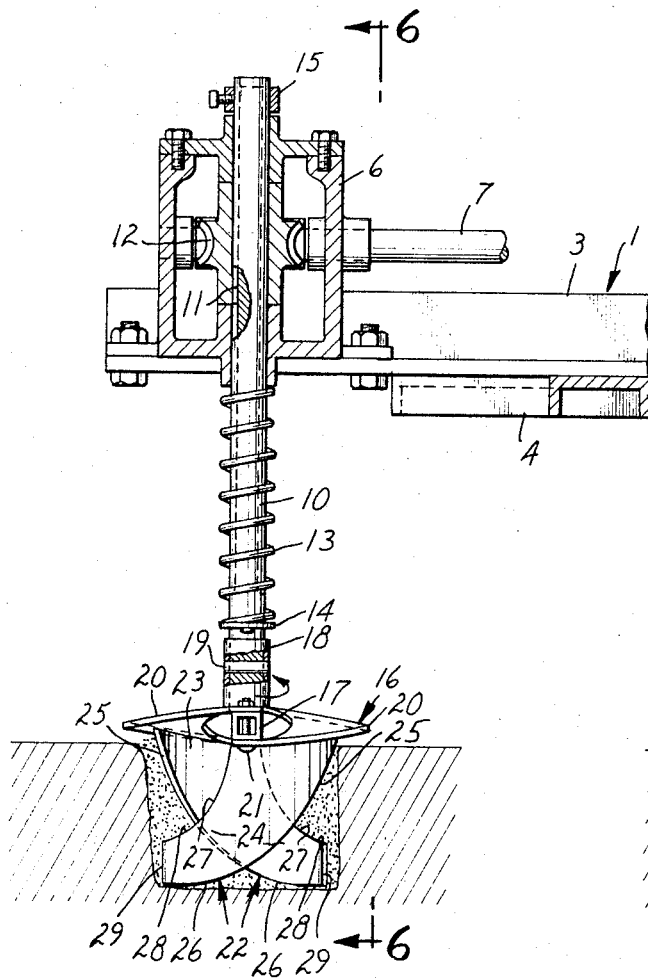
FIG. 5 is an enlarged fragmentary view partly in front elevation and partly in section, taken substantially on the line 5—5 of FIG. 1.

Referring with greater detail to the drawings, the numeral 1 indicates in its entirety a draft frame, which comprises a pair of front and rear transverse frame members 2 and 3, respectively, and a pair of forwardly converging angle braces 4 that are preferably welded or otherwise rigidly secured at their rear ends to the frame members 2 and 3. A draft tongue or the like 5 is rigidly secured to the front ends of the angle braces 4, and extends forwardly therefrom for connection to the draw bar of a tractor, not shown, or other suitable means for imparting movement to the frame 1. Preferably, the frame 1 is adapted to be operatively connected to a gang of conventional seed planters, not shown, but in the manner disclosed in my above-mentioned prior Patent Reissue 25,237.

A plurality of transmission housings or the like 6 are bolted or otherwise rigidly secured to the frame members 2 and 3 in laterally spaced relationship. For the purpose of the present example, the transmission housings 6 are four in number, it being assumed that the frame 1 will be associated with a planting implement having a like number of planting units. A transverse shaft 7 extends through and is journalled in each of the housings 6 and through a central gear box 8 that is also bolted to the frame members 2 and 3. The shaft 7 is operatively coupled within the gear box 8 to a drive shaft 9 by suitable gearing, not shown. The drive shaft 9 extends forwardly from the gear box 8 and may be assumed to be coupled to a source of power, such as a power take-off mechanism on the tractor, not shown.

Figure 6:
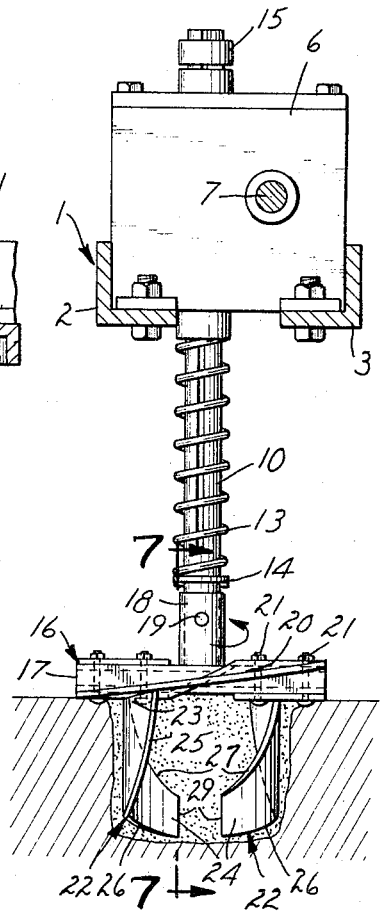
FIG. 6 is a fragmentary view in section, taken substantially on the line 6—6 of FIG. 5.
Figure 7:
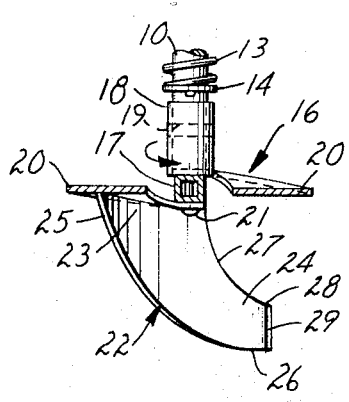
FIG. 7 is a fragmentary view taken substantially on the line 7—7 of FIG. 6.

Mounted for rotary and vertically axially sliding movements in each of the transmission housings 6 is one of a plurality of vertically disposed shafts 10 that extend downwardly from their respective housings 6. With reference to FIG. 5, it will be seen that each shaft 10 is splined or keyed, as indicated at 11, to a worm wheel or the like 12 within its respective transmission housing 6 for common rotation with the worm wheel 12 and for axial sliding movements relative thereto. Each worm wheel 12 is driven by a cooperating worm, not shown, but mounted on the shaft 7 in its respective transmission housing 6, whereby rotary movement is imparted to its respective vertical shaft 10. Each vertical shaft 10 is yieldingly urged in a downward direction of its axial movement by a coil compression spring 13 interposed between the bottom of its respective housing 6 and a washer-equipped stop pin or the like 14, see particularly FIGS. 5 and 6. A stop collar 15, releasably secured to the upper end portion of each vertical shaft 10, is adapted to engage the top of its respective transmission housing 6 to limit spring biased downward movement of its respective vertical shaft 10.

The mulching heads of this invention, indicated generally by the reference character 16, are attached one each to the lower end of a different one of the vertical shafts 10, as shown in FIG. 2. The mulcher heads 16, being identical, but one thereof will be described in detail. With reference to FIGS. 3–7, it will be seen that each mulcher head comprises a horizontally elongated bar-like head element 17 having an upwardly extending tubular socket 18 welded or otherwise rigidly secured to the central portion thereof, the socket 18 receiving the lower end of the vertical shaft 10 and releasably anchored thereto by a transverse pin 19 extending through aligned openings in the socket 18 and shaft 10, see particularly FIGS. 5 and 6. A pair of diametrically opposed semi-annular helicoidal plate-like members 20 are bolted or otherwise rigidly secured to opposite end portions of the head element 17, by nut-equipped bolts or the like 21. As shown, each member 20 has one end overlying and engaging the top surface of the head element 17 adjacent an opposite end thereof, the other end of each plate-like member 20 underlying and engaging the bottom surface of the head element 17 at its other end portion, whereby the members 20 are disposed in the manner of cooperating auger flights.

Each mulcher head 16 further includes a pair of diametrically opposed vertical mulching blades 22 preferably formed from heavy sheet steel or the like, as are the helicoidal plate-like members 20. The blades 22 of each mulcher head 16 are substantially identical, each blade 22 comprising an upper leading portion 23 that is welded along its upper edge to the under surface of a respective one of the helicoidal members 20, and a lower trailing portion 24. The blades 22 are disposed in vertical planes and, as shown in FIGS. 3 and 4, are cross-sectionally curved generally in the direction of rotation of the mulcher head 16, the curvature being eccentric to the axis of rotation of the mulcher head 16. The upper leading portion 23 of each mulcher blade 22 defines a leading edge 25 that curves downwardly and rearwardly relative to the direction of rotation of the mulcher head 16, the lower end portion of the edge 25 terminating in a substantially horizontal lower edge 26 of the trailing portion 24. The upper leading portion 23 of each blade 22 further defines a downwardly and rearwardly curving trailing edge 27 which terminates at its lower rear end portion in an upper edge 28 of the trailing portion 24, the trailing portion 24 defining a generally vertically disposed trailing edge 29.

The horizontally cross-sectional curvature of the blades 22 is such that the leading edge portions 25 are radially spaced from the axis of rotation of the mulcher head a greater distance than other portions of the blades 22 rearwardly thereof in the direction of rotation thereof. Thus, as each mulcher head is rotated in the direction indicated by arrows in FIGS. 1 and 3–7, and the entire implement moved forwardly, the blades 22 dig into the earth with a slicing action that is immediately followed by a generally radially inward earth-displacing action. With reference to FIGS. 2 and 5–7, it will be seen that the leading and trailing edges 25 and 27 respectively of each blade 22 converge downwardly and rearwardly to define opposite ends of the trailing edge 29 that is considerably shorter in length than the transverse dimension of its respective cutting blade 22 between the upper ends of the leading and trailing edges 25 and 27 respectively. The resulting shape of each mulching blade 22 is very effective in providing for relatively easy movement through the earth, the transversely cross-sectional curvature of the blades 22 causing the same to effectively pulverize the soil and condition the same for planting. The downward force applied to the mulcher heads 16 by their respective springs 13 normally causes the mulcher heads 16 to penetrate into the earth to the extent permitted by the engagement of the helicoidal members 20 with the top surface of the earth, this engagement limiting downward movement of the mulcher heads 16. In the event that one of the mulching blades 22 encounters a hard object, such as a stone or the like, the downward and rearward curvature of the leading edge 25 causes the mulcher head 16 to ride upwardly over the encountered object without damage to the mulching blade. After the mulcher head has passed over the object, the bias of the spring 13 will cause the mulching blades 22 to again penetrate to the depth permitted by the helicoidal members 20. It should be borne in mind, that the frame 1 is normally disposed at a level above the ground wherein the stop collars 15 are upwardly spaced from their respective transmission housings 6, whereby to permit the helicoidal members 20 to engage the surface of the earth to limit downward movement of the mulching blades 22 therein.

Should damage occur to either one or the other of the mulching blades 22, it is a simple matter to either remove the entire head 16 from the lower end of its respective shaft 10, or to remove the damaged blade 22 with its cooperating helicoidal member 20 from the head element 17, by removal of the nut-equipped screws or bolts 21.

The mulcher head of this invention has been thoroughly tested, and has been found to produce a well-cultivated row or strip of earth, highly suitable for planting of corn and other row crops, while leaving the ground between the mulched strips in its earlier plowed condition.

While I have shown and described a preferred embodiment of my mulcher head, it will be understood that the same is capable of modification without departure from the spirit and scope of the invention, as defined in the claims.

I claim:
1. A mulching device comprising,
  (a) a head element having a central portion adapted to be mounted on the lower end of a vertically extended rotary and vertically movable shaft for common vertical movements therewith and for common rotation therewith in a given single direction,
  (b) a pair of circumferentially spaced generally helicoidal plate-like members rigidly secured to said head element concentric with said central portion,
  (c) and a pair of circumferentially spaced generally vertically disposed mulching blades each depending from a different one of said plate-like members for common movements therewith,
  (d) said plate-like members being pitched upwardly in the direction of rotation of the head element and engageable with the surface of the earth to limit downward movement of said blades in the earth during rotation of said head element and blades.
2. A mulching device comprising,
  (a) a head element having a central portion adapted to be mounted on the lower end of a vertically extended rotary and vertically movable shaft for common vertical movements therewith and for common rotation therewith in a given single direction,
  (b) a pair of circumferentially spaced generally helicoidal plate-like members rigidly secured to said head element concentric with said central portion,
  (c) and a pair of circumferentially spaced generally vertically disposed mulching blades each depending from a different one of said plate-like members for common movement therewith,
  (d) each of said blades being curved generally in the direction of rotation of the head element and having an upper leading portion and a lower trailing portion downwardly of said upper leading portion and generally circumferentially rearwardly thereof relative to said direction of rotation of the head element,
  (e) said plate-like members being pitched upwardly in the direction of rotation of the head element and engageable with the surface of the earth to limit downward movement of said blades in the earth during rotation of said head element and blades.
3. A mulching device comprising,
  (a) a head element having a central portion adapted to be mounted on the lower end of a vertically extended rotary and vertically movable shaft for common vertical movements therewith and for common rotation therewith in a given single direction,
  (b) a pair of circumferentially spaced generally helicoidal plate-like members rigidly secured to said head elements concentric with said central portion,
  (c) and a pair of circumferentially spaced generally vertically disposed mulching blades each depending from a different one of said plate-like members for common movements therewith,
  (d) each of said blades being disposed in a vertical plane which is curved in horizontal section, the curve of said plane being eccentric to the axis of rotation of said head element and blades,
  (e) each of said blades having an upper leading por- tion and a lower trailing portion downwardly of said upper leading portion and generally circumferentially rearwardly thereof relative to said direction of rotation of the head element, (f) said plate-like members being pitched upwardly in the direction of rotation of the head element and engageable with the surface of the earth to limit downward movement of said blades in the earth during rotation of said head element and blades.

4. The structure defined in claim 3 in which said leading portion of each of said blades has a leading edge curving downwardly and rearwardly relative to the direction of rotation of said head element, whereby to define a bottom edge of said trailing portion of its respective blade.

5. The structure defined in claim 3 in which said leading portion of each blade has a trailing edge curving downwardly and rearwardly relative to the direction of rotation of said head element, whereby to provide a top edge of said trailing portion of its respective blade.

6. A mulching device comprising,
(a) a horizontally disposed bar-like head element having vertically spaced top and bottom surfaces,
(b) means centrally of the opposite ends of said head element for mounting said head element on the lower end of a vertically extended rotary and vertically movable shaft for common rotary and vertical movements therewith,
(c) a pair of diametrically opposed semi-annular generally helicoidal plate-like members each rigidly secured at one end to the top surface of said head element at a different end portion thereof, and at its other end to the bottom surface of said head element at the opposite end portion thereof, said plate-like members being concentric with the axis of rotation of said head element,
(d) and a pair of diametrically opposed vertical mulching blades each having an upper leading end portion rigidly secured to a different one of said plate-like members and a lower trailing end portion generally circumferentially rearwardly of its respective upper end portion relative to the direction of rotation thereof,
(e) said plate-like members being engageable with the surface of the earth to limit downward movement of said blades in the earth during rotation of said head element and blades.

References Cited
UNITED STATES PATENTS

Re. 25,237    9/1962    Heeren    172—111 X
1,176,992    3/1916    Sholl    175—394 X

FOREIGN PATENTS 1,315,237    12/1962    France.
367,302    6/1959    Japan.

ABRAHAM G. STONE, *Primary Examiner.*

W. A. SMITH III, *Assistant Examiner.*